Nov. 18, 1941.   A. C. WINDOLPH   2,263,023

CAMERA FILM

Filed Jan. 27, 1940

Inventor

Alfonze C. Windolph.

By Clarence A. O'Brien
and Hyman Berman
Attorneys

Patented Nov. 18, 1941

2,263,023

UNITED STATES PATENT OFFICE 2,263,023

CAMERA FILM

Alfonze C. Windolph, Grand Island, Nebr.

Application January 27, 1940, Serial No. 316,011

2 Claims. (Cl. 95—9)

The present invention relates to roll films for cameras and has for its primary object to provide a reinforcing or anchoring tab or extension on one or both ends of the film adapted to secure the same in the usual slot provided in the film spool to prevent accidental removal of the film therefrom.

A further object is to provide an attachment of this character of simple and practical construction, which may be easily and inexpensively applied to the film without necessitating any changes in the construction of the film, and which is otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which:

Figure 1:
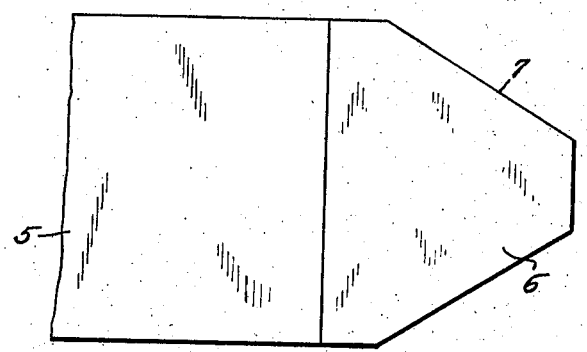
Figure 1 is a fragmentary plan view of one end portion of a roll of film showing the anchoring attachment in position thereon.
Figure 2:
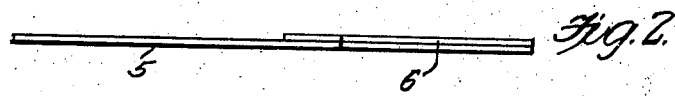
Figure 2 is an edge elevational view thereof.

Referring now to the drawing in detail, with particular reference to Figures 1 and 2, the numeral 5 designates the end of the roll of film and to one side of which is suitably secured a strip of tin-foil 6, or similar thin metallic body or substitute thereof in sheet form and having similar bendable characteristics. The strip 6 may be secured to the end portion of the film 5 in any suitable manner, as by gluing, stapling or the like.

The strip of tin-foil 6 is coextensive with the end of the film and may have its longitudinal edges 7 inclined or cut at an angle to facilitate the insertion of the extended end of the strip into the slot of the usual film spool (not shown). The strip 6 may then be bent or rolled around the spool and thus provides a more secure anchor for the end of the film than is ordinarily possible.

Figure 3:
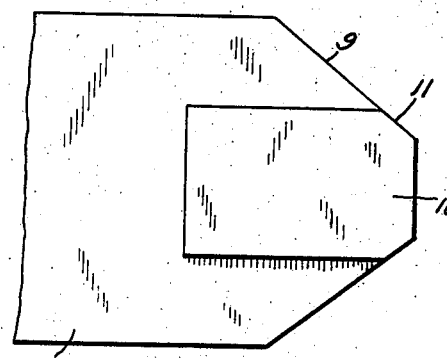
Figure 3 is a top plan view of a modified form of the attachment.
Figure 4:
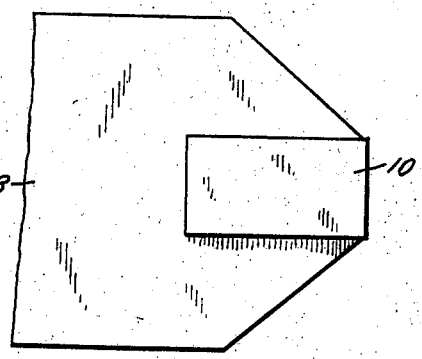
Figure 4 is a similar view of a further modification.
Figure 5:
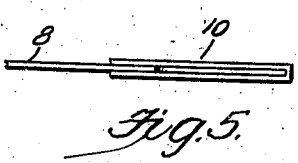
Figure 5 is a side elevational view of the form of invention illustrated in Figure 4.

In the form of the invention illustrated in Figure 4 the film is designated at 8 and is provided with inclined longitudinal edges 9 at its end portions to facilitate the insertion of the end of the film in the slot of the spool. The strip of tin-foil is shown at 10 and may have its end portions folded over opposite sides of the film as shown in Figure 5 of the drawing, and suitably secured thereto. In the form of the invention illustrated in Figure 3 the tin-foil 10' may be of greater width than that shown in Figure 4 to overlie a portion of the inclined edge 9 and a portion of the strip of tin-foil may have its longitudinal edges cut as shown at 11 in the plane of the inclined edges of the film.

Figure 6:
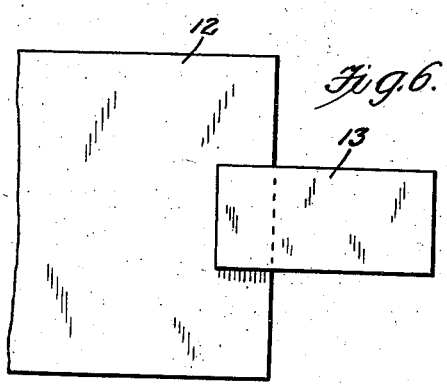
Figure 6 is a top plan view showing the anchoring member in the form of a tab projecting out from the end of the film.
Figure 7:
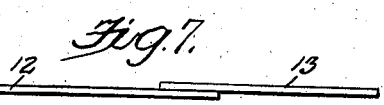
Figure 7 is an edge elevational view thereof.

In the form of the invention illustrated in Figures 6 and 7 the film is designated at 12 and projecting outwardly from the square end thereof is a tab 13 of tin-foil which is suitably secured to one surface of the film.

It is believed the details of construction and advantages of the invention will be readily understood from the foregoing without further detailed explanation.

Having described the invention, what I claim is:

1. An anchoring attachment for a roll of film for securing the same in the slot of a film spool, said film having converging longitudinal edges adjacent its end to provide a blunt extremity, said attachment comprising a thin flexible metallic strip bent upon itself intermediate its ends and secured to opposite surfaces of the film at the end portion thereof to cover said extremity, said metallic strip having a portion of its longitudinal edges inclined and positioned in alinement with the converging edges of the film to increase the thickness of the edge of the film immediately adjacent said blunt extremity.

2. An anchoring attachment for a roll of film adapted for securing the end of the film in the slot of a film spool, said film having converging longitudinal edges adjacent its end to provide a blunt extremity, said attachment comprising a thin metallic sheet of flexible material having a marginal contour corresponding to the contour of the end portion of the film and means for securing said metallic sheet to the film to maintain the said end portion thereof against unrolling movement when engaged on the spool.

ALFONZE C. WINDOLPH.